(12) United States Patent
Yamaoka et al.

(10) Patent No.: US 12,246,631 B2
(45) Date of Patent: Mar. 11, 2025

(54) VEHICLE SEAT

(71) Applicant: TACHI-S CO., LTD., Tokyo (JP)

(72) Inventors: Shunsuke Yamaoka, Tokyo (JP); Daiki Fumiiwa, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 129 days.

(21) Appl. No.: 18/110,599

(22) Filed: Feb. 16, 2023

(65) Prior Publication Data

US 2023/0264616 A1 Aug. 24, 2023

(30) Foreign Application Priority Data

Feb. 22, 2022 (JP) ................... 2022-025563

(51) Int. Cl.
*B60N 2/68* (2006.01)

(52) U.S. Cl.
CPC .................... *B60N 2/686* (2013.01)

(58) Field of Classification Search
CPC ............................ B60N 2/686; B61D 33/0014
USPC ................. 297/452.18, 283.1, 284.4
See application file for complete search history.

(56) References Cited

U.S. PATENT DOCUMENTS

| | | | | |
|---|---|---|---|---|
| 2,894,565 A * | 7/1959 | Connor | ..................... | A47C 7/46 297/284.7 |
| 3,990,742 A * | 11/1976 | Glass | ..................... | A47C 7/029 297/284.3 |
| 4,350,388 A * | 9/1982 | Weiner | ..................... | A47C 7/46 297/284.7 |
| 4,555,137 A * | 11/1985 | Goldner | ..................... | B60N 2/00 297/284.7 |
| 7,731,293 B1* | 6/2010 | Donovan | ............... | B60N 2/686 297/452.18 |
| 8,398,170 B2* | 3/2013 | Walker | ..................... | A47C 7/144 297/284.6 |
| 2005/0184568 A1* | 8/2005 | Schmidt | ................. | A47C 7/465 297/284.4 |
| 2005/0275263 A1* | 12/2005 | Norman | ................. | A47C 7/467 297/284.4 |
| 2006/0033369 A1* | 2/2006 | Eysing | .................... | A47C 7/467 297/284.4 |
| 2006/0261653 A1* | 11/2006 | McMillen | ............... | A47C 7/465 297/284.4 |

(Continued)

FOREIGN PATENT DOCUMENTS

JP 2016-150732 A 8/2016
WO WO-9408492 A1 * 4/1994 ............. B60N 2/667

*Primary Examiner* — Jose V Chen
(74) *Attorney, Agent, or Firm* — FITCH, EVEN, TABIN & FLANNERY, ULP

(57) ABSTRACT

In order to cause no difficulty in an assembling process for assembling a resin plate to a seatback even if a plurality of bosses formed on the resin plate vary somewhat in dimension in a height direction, and also in order to prevent unpleasant noise, a vehicle seat is provided in which the resin plate of the seatback has a plurality of bosses formed thereon in positions facing the seatback frame, and under no load on the resin plate, some of the plurality of bosses are in contact with the seatback frame and the remaining ones of the plurality of bosses are out of contact with the seatback frame. On the other hand, while the resin frame is deformed by application of load in a direction of the seatback frame, the some bosses and the remaining bosses are in contact with the seatback frame to bear the load.

11 Claims, 6 Drawing Sheets

(56) References Cited

U.S. PATENT DOCUMENTS

| | | | |
|---|---|---|---|
| 2007/0176480 A1* | 8/2007 | Brunner | B29C 49/04 |
| | | | 297/452.18 |
| 2008/0315650 A1* | 12/2008 | Habegger | B60N 2/66 |
| | | | 297/284.4 |
| 2009/0096264 A1* | 4/2009 | Himmel, IV | B60N 2/66 |
| | | | 297/284.4 |
| 2012/0007399 A1* | 1/2012 | Jaranson | B60N 2/66 |
| | | | 297/284.4 |
| 2013/0192904 A1* | 8/2013 | Sprecher | B60N 2/686 |
| | | | 177/136 |
| 2013/0241259 A1* | 9/2013 | Pozzi | B60N 2/66 |
| | | | 297/452.18 |

* cited by examiner

F I G . 3
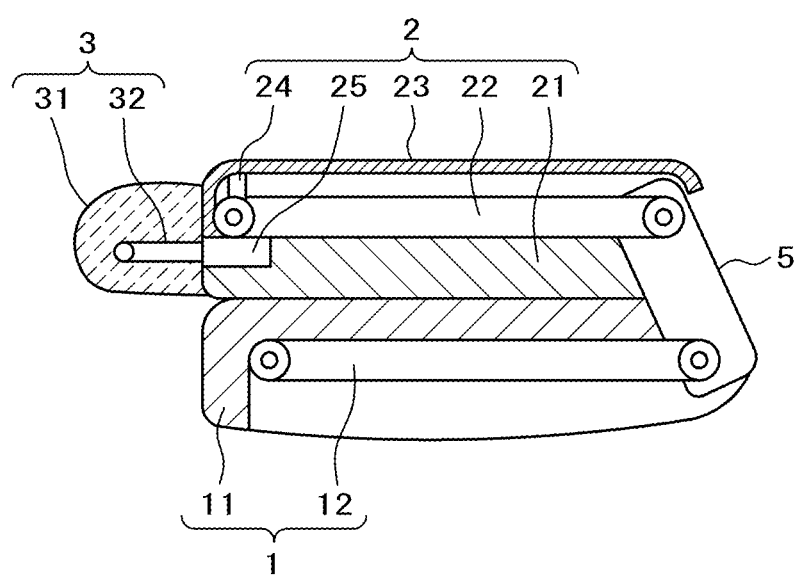

VEHICLE SEAT

CROSS-REFERENCE TO RELATED APPLICATIONS

This application claims priority from Japanese Application No. 2022-025563, filed Feb. 22, 2022 which is incorporated herein by reference in its entirety.

BACKGROUND OF THE INVENTION

The present invention relates to a vehicle seat.

A seatback of a vehicle seat is configured to include a cushion member that is placed on the side thereof on which an occupant sitting in the vehicle seat rests his/her back, a frame that supports the cushion member, and a cover member that covers a rear side of the frame.

Japanese Unexamined Patent Application Publication No. 2016-150732 discloses the configuration for the seatback in which a rear side panel formed by press-molding sheet metal is welded to the frame body.

For forming the rear side panel of the seatback by use of resin in lieu of the press-molded sheet metal as disclosed in the above Japanese Unexamined Patent Application Publication No. 2016-150732, there is a possible method of making contact between the frame body and a plurality of protrusions such as bosses or the like placed on the resin-made rear side panel, rather than placing the resin-made rear side panel in entire contact with the frame body.

However, if, on the side of the resin-made rear side panel, the protrusions such as bosses or the like are formed integrally with the rear side panel, variations in height among the plurality of bosses can occur depending on the forming conditions, thus giving rise to difficulties in an assembling process for assembling the resin plate to the seatback.

Further, when baggage is put on the resin-made rear side panel of the seatback folded toward the seat cushion, the plurality of bosses may move in slight contact with the metallic seatback frame, thereby causing unpleasant noise.

SUMMARY OF THE INVENTION

It is an object of the present invention to solve the above problems and provide a vehicle seat that does not cause difficulties in an assembling process for assembling a resin plate to a seatback even if a plurality of bosses formed on the resin plate of the seatback vary somewhat in dimension in the height direction relative to design dimensions, and also preventing unpleasant noise from occurring due to movement of a plurality of bosses in slight contact with a metallic seatback frame.

To address the above problem, in an aspect of the present invention, a vehicle seat includes a seat cushion, a seatback, and a headrest. The seatback has a seatback pad, a seatback frame and a resin plate. The resin plate has a plurality of bosses formed thereon in positions facing the seatback frame. Under no load on the resin plate, some of the plurality of bosses are in contact with the seatback frame and the remaining ones of the plurality of bosses are out of contact with the seatback frame.

To address the above problem, in another aspect of the present invention, a vehicle seat includes a seat cushion, a seatback, and a headrest. The seatback has a seatback pad, a seatback frame and a resin plate. The resin plate has a plurality of bosses of a higher height and a plurality of bosses of a lower height formed integrally therewith in positions facing the seatback frame, and under no load on the resin plate, the plurality of bosses of the higher height are in contact with the seatback frame and the plurality of bosses of the lower height are out of contact with the seatback frame.

According to the present invention, even if a plurality of bosses formed on a resin plate of a seatback vary somewhat in dimension in the height direction relative to design dimensions, the difficulties are eliminated in the assembling process for assembling the resin plate to the seatback.

According to the present invention, further, upon the resin plate being loaded to be deformed, the plurality of bosses are structured to come into contact with the metallic frame at the same time. This enables relieving stress concentration on the resin plate, so that relatively high load may be withstood.

According to the present invention, furthermore, unpleasant noise can be prevented from being caused by movement of the plurality of bosses in slight contact with a metallic seatback frame.

BRIEF DESCRIPTION OF THE DRAWINGS

FIG. 3 is a cross-sectional view taken along arrows B-B of FIG. 2;

DETAILED DESCRIPTION OF THE PREFERRED EMBODIMENTS

The present invention is connected with the configuration to prevent serious deformation of a resin plate in the manner in which bosses are formed on the resin plate covering the rear side of a seatback such that the bosses come into contact with a metallic frame of the seatback when the seatback of the vehicle seat is folded toward the seat cushion and then baggage is put on the seatback.

In order to support a load of baggage put on the resin plate with the resin plate, there is a need for a structure such that a plurality of bosses formed integrally with the resin plate come into contact with a plurality of portions of the metallic frame of the seatback to bear the load.

However, in the configuration in which each of the bosses is in contact with the metallic frame under no load, variations in dimension in the height direction among the plurality of bosses may make it difficult to assemble the resin plate with the bosses formed integrally to the seatback.

Further, in the conditions where the bosses are in slight contact with the metallic frame due to the variations in dimension in the height direction, when the seatback is folded toward/unfolded from the seat cushion, the bosses and the metallic frame may rub against each other to produce unpleasant noise due to movement of the bosses in slight contact with the metallic frame.

The present invention addresses these disadvantages and achieves a structure to reduce the number of places where the bosses formed integrally with the resin plate are in contact with the metallic frame of the seatback under no load on the resin plate on the rear side of the seatback, and to bring the plurality of bosses formed on the resin plate into contact with the metallic frame at the same time while the resin plate is loaded and deformed.

With such a structure, even if the bosses vary somewhat in dimension in the height direction relative to design dimensions, no difficulty may be caused in the assembling process for assembling the resin plate to the seatback. Further, unpleasant noise may be prevented from occurring due to movement of the bosses in slight contact with the metallic frame.

Embodiments according to the present invention will now be described in detail with reference to the accompanying drawings. Like reference signs refer to elements having similar functions throughout the figures used for description of the embodiments, and a repetitive description is omitted in principle.

However, the present invention should not be construed as being limited to details of the following embodiments. Those skilled in the art will readily understand that the specific configurations described herein can be changed without deviating from the scope and spirit of the present invention.

EMBODIMENTS

Figure 1:
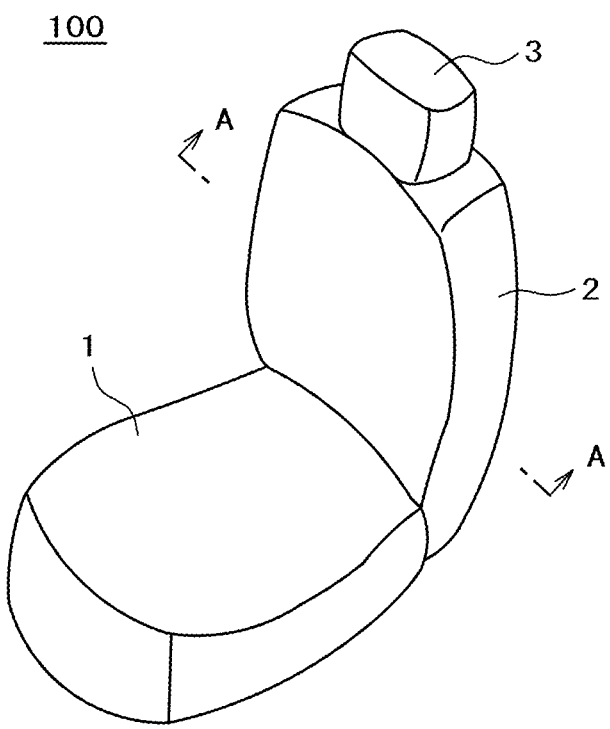
FIG. 1 is a perspective view of an overall configuration of a vehicle seat according to an embodiment.

FIG. 1 is a perspective view of an overall configuration of a vehicle seat 100 according to an embodiment. The vehicle seat 100 according to the embodiment includes a seat cushion 1 on which an occupant sits, a seatback 2 against which the seated occupant leans his/her back, and a headrest 3 for protecting the head of the seated occupant.

It is noted that an actual vehicle seat includes other mechanisms such as a reclining mechanism for adjusting an angle of the seatback 2 with respect to the seat cushion 1, an air blower for blowing air into the seat cushion 1 and the seatback 2, a lumbar mechanism for pressing on the lumbar area of the seated occupant from the seatback 2, and the like. However, they are not directly related to the present invention and therefore, for simplified description, illustration and description on their configurations are omitted.

Figure 2:
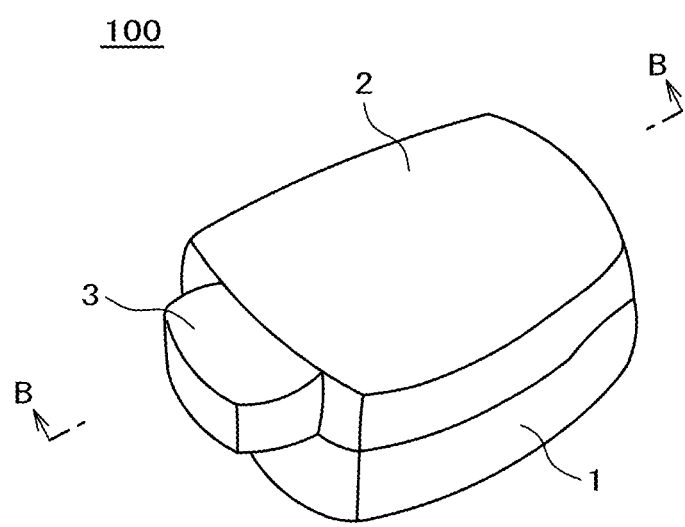
FIG. 2 is a perspective view of the vehicle seat according to the embodiment when a seatback is folded toward a seat cushion.

FIG. 2 is a perspective view of the vehicle seat 100 according to the embodiment when the seatback 2 is folded toward the seat cushion 1. By folding the seatback 2 onto the seat cushion 1 in this manner, the top face of the seatback 2 (the surface of the upper side of the seatback 2 in FIG. 2) may be placed approximately parallel to the floor (not shown, under the seat cushion 1 in FIG. 2) of the vehicle, so that baggage can be put on the top face of the seatback 2.

FIG. 3 is a cross-sectional view taken along arrows B-B of FIG. 2 when the seatback 2 is folded toward the seat cushion 1 in this manner.

In the state illustrated in FIG. 3, the resin plate 23 held by the seatback frame 22 is positioned on the top face of the seatback 2 during contact between the seat cushion pad 11 held by a frame (seat cushion frame) 12 on the seat cushion 1 side and a seatback pad 21 held by a frame (seatback frame) 22 on the seatback 2 side.

In the configuration illustrated in FIG. 3, the seat cushion frame 12 and the seatback frame 22 are rotatably connected through a connection plate 5.

Tubular headrest supports 25 are secured to the seatback frame 22. Headrest frames 32 support a cushion member 31 of a headrest 3, and leading end portions of the headrest frames 32 are inserted into and supported by the respective headrest supports 25.

Figure 4:
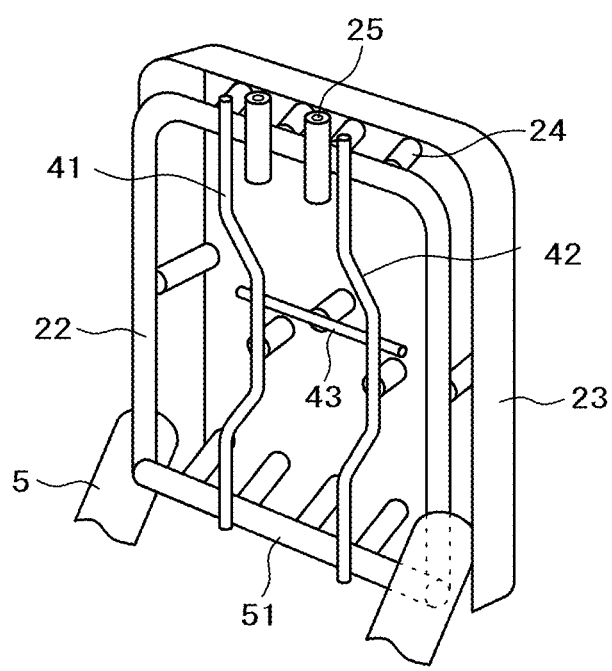
FIG. 4 is a perspective view of the vehicle seat according to the embodiment when a pad of the seatback is removed and the seatback frame and the resin plate are combined together.

FIG. 4 is a cross-sectional view of the vehicle seat 100 taken along arrows A-A of FIG. 1. Specifically, FIG. 4 is an oblique view when the seatback pad 21 of the seatback 2 is removed and the seatback frame 22 and the resin plate 23 are combined together.

In FIG. 4, auxiliary frames 41 and 42 are connected between the seatback frame 22 and a coupling bar 51. A transverse frame 43 is connected between the auxiliary frames 41 and 42. Further, on the resin plate 23, a plurality of protrusions (bosses) 24 are formed integrally with the resin plate 23.

Figure 5:
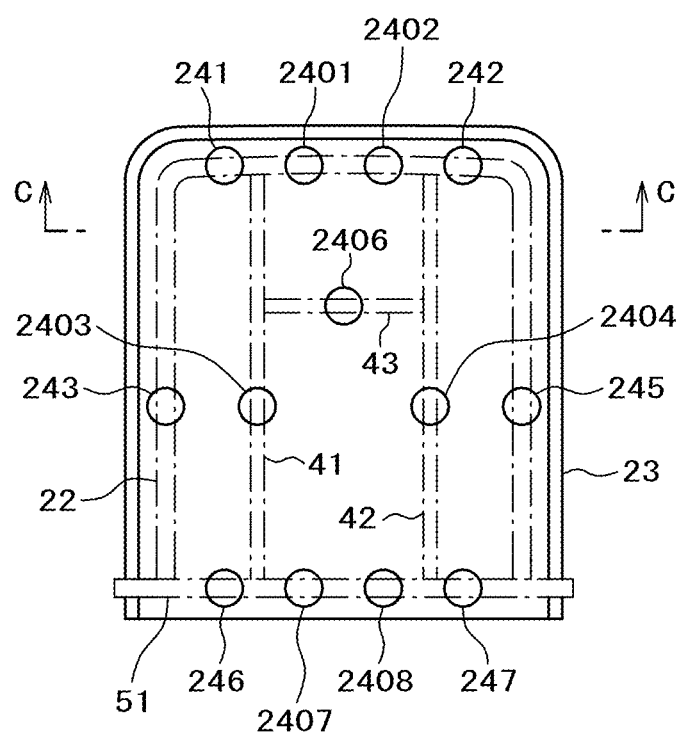
FIG. 5 is a front view of the vehicle seat according to the embodiment when the pad of the seatback is removed and the seatback frame and the resin plate are combined together.

FIG. 5 illustrates a front view of the configuration in FIG. 4. A plurality of protrusions (bosses) 24 (all the protrusions (bosses) described in FIG. 5 will be hereinafter collectively referred to as "protrusions (bosses) 24") are formed on the resin plate 23. Of the protrusions (bosses) 24, protrusions (bosses) 241, 242, 243, 245 and protrusions (bosses) 2401, 2402, 2403, 2404 are arranged on the backside of the seatback frame 22.

Also, protrusions (bosses) 2403, 2404 are arranged on the backside of the auxiliary frames 41 and 42. A protrusion (boss) 2406 is arranged on the backside of the transverse frame 43.

Further, protrusions (bosses) 246, 247, 2407 and 2408 are arranged on the backside of the coupling bar 51.

Figure 6:
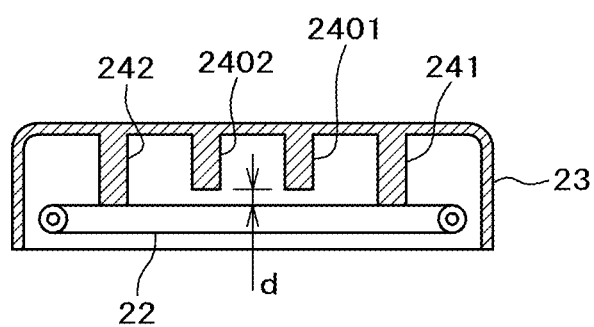
FIG. 6 is a view showing upside down turning of the cross-sectional view taken along arrows C-C of FIG. 5, in which the resin plate is under no load.
Figure 7:
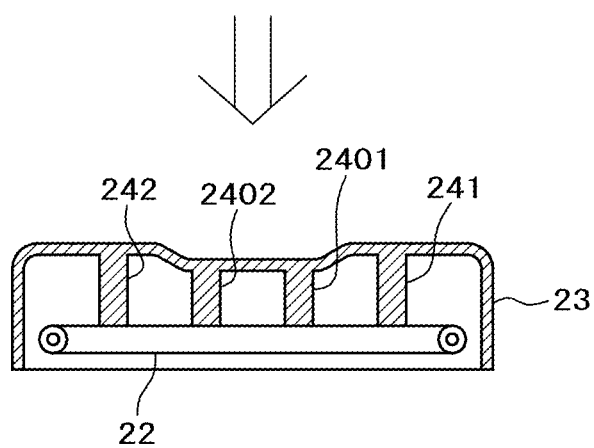
FIG. 7 is a view showing upside down turning of the cross-sectional view taken along arrows C-C of FIG. 5, in which the resin plate is under load on the resin plate in the arrow direction.

FIGS. 6 and 7 are views showing upside down turning of section C-C of FIG. 5, in which the resin plate 23 faces upward.

FIG. 6 illustrates the resin plate 23 under no load, and FIG. 7 illustrates the resin plate 23 under load in the arrow direction. Specifically, FIG. 6 illustrates a situation where baggage is not put on the resin plate 23 after the seatback 2 is folded toward the seat cushion 1 as illustrated in FIG. 3. FIG. 7 illustrates a situation where baggage is put on the resin plate 23 to apply a load thereon in the arrow direction shown in FIG. 7 after the seatback 2 is folded toward the seat cushion 1 as illustrated in FIG. 3.

As illustrated in FIG. 6, when the resin plate 23 is under no load, the protrusions (bosses) 241 and 242 formed on the resin plate 23 are in contact with the seatback frame 22, and a gap of distance d is created between the seatback frame 22 and the protrusions (bosses) 2401 and 2402 which are located between the protrusions (bosses) 241 and 242.

In this manner, only the protrusions (bosses) 241 and 242 formed on the resin plate 23 are configured to be in contact with the seatback frame 22 under no load on the resin plate 23. By this configuration, even if dimensions in the height direction vary somewhat between the protrusions (bosses) 241, 242 and the protrusions (bosses) 2401, 2402, it is possible to eliminate the cause of impairing the assembly workability when the resin plate 23 is assembled to the seatback frame 22.

In case of the configuration where the protrusions (bosses) 241, 242 and the protrusions (bosses) 2401, 2402 simultaneously come into contact with the seatback frame 22, if dimensions in the height direction vary somewhat between the projections (bosses) 241, 242 and the projections (bosses) 2401, 2402, variation in pressure of contact with the seatback frame 22 will be caused when the resin plate 23 is assembled to the seatback frame 22. This will cause rubbing in a portion with a low contact pressure, which in turn cause unpleasant noise. In contrast, in the example, a dimension in the height direction of the protrusions (bosses) 2401 and 2402 is set such that a gap of a distance d is created between the seatback frame 22 and the protrusions (bosses) 2401, 2402. As a result, occurrence of unpleasant noise may be prevented.

On the other hand, as illustrated in FIG. 7, if a load in the arrow direction is applied to the resin plate 23, the resin plate 23 is deformed downward of FIG. 7 to bring also the protrusions (bosses) 2401 and 2402 into contact with the seatback frame 22. Thus, the load on the resin plate 23 in the arrow direction is borne by the protrusions (bosses) 241 and 242 and the projections (bosses) 2401 and 2402, so that the amount of deformation of the resin plate 23 in the arrow direction may be reduced to be no more than d, and the resin plate 23 is prevented from being greatly deformed by the application of load.

Referring to FIGS. 6 and 7, the configuration in the cross-sectional view taken along arrow C-C of FIG. 5 has been described. The relationship between the protrusions (bosses) 243, 245 and the protrusions (bosses) 2403, 2404, 2406 illustrated in FIG. 5, and the relationship between the protrusions (bosses) 246, 247 and the protrusions (bosses) 2407, 2408 are the same as the relationship between the protrusions (bosses) 241, 242 and the protrusions (bosses) 2401, 2402 in FIGS. 6 and 7.

Specifically, the protrusions (bosses) 2403, 2404, 2406 that are formed between the protrusions (bosses) 243 and 245 are formed with a lower height than that of protrusions (bosses) 243, 245. Therefore, under no load on the resin plate 23 (corresponding to the conditions described in FIG. 6), the protrusions (bosses) 243, 245 are in contact with the seatback frame 22, and the protrusions (bosses) 2403, 2404, 2406 are located to create a gap of a distance d from the auxiliary frames 41 and 42 and the transverse frame 43, respectively.

In the same manner, under no load conditions in which the resin plate 23 is not loaded (corresponding to the conditions described in FIG. 6), the protrusions (bosses) 246, 247 are in contact with the coupling bar 51, and the protrusions (bosses) 2407, 2408 formed between the protrusions (bosses) 246 and 247 are located to create a gap of a distance d from the coupling bar 51.

On the other hand, under load on the resin plate 23 (corresponding to the conditions described in FIG. 7), all of the protrusions (bosses) 243, 245 and the protrusions (bosses) 2403, 2404, 2406 are in contact with the seatback frame 22, and also all of the protrusions (bosses) 246, 247 and the protrusions (bosses) 2407, 2408 are in contact with the coupling bar 51.

In this manner, under no load on the resin plate 23, only some of the plurality of protrusions (bosses) formed on the resin plate 23 are in contact with the seatback frame 22 or the coupling bar 51. Under load on the resin plate 23, all of the protrusions (bosses) 24 are in contact with all of the seatback frame 22, the coupling bar 51, the auxiliary frames 41, 42, and the transverse frame 43 in order to prevent the resin plate 23 from being greatly deformed.

The protrusions (bosses) 24 described in FIG. 4 to FIG. 7 are described as structured to be circular in cross section, but they may have another cross-sectional shape. Also, the number of protrusions (bosses) 24 that are out of contact with the seatback frame 22, the auxiliary frames 41, 42, the transverse frame 43 and the coupling bar 51 under no load on the resin plate 23, described in the example, is by way of example only, and may be more than or less than that described in the example.

As described above, in the structure according to the example, of the plurality of bosses 24 formed integrally with the resin plate 23, the number of bosses 24 in contact with the seatback frame 22 under no load on the resin plate 23 on the rear side of the seatback 2 is reduced in number. By this structure, even if there are some variations in dimension in the height direction relative to design dimensions among the plurality of bosses 24, no difficulty is caused in the assembling process for assembling the resin plate 23 to the seatback 2.

On the other hand, when the resin plate 23 is loaded and deformed, the plurality of bosses 24 formed on the resin plate 23 are all come into contact with the metallic seatback frame 22, the coupling bar 51, the auxiliary frames 41, 42, and the transverse frame 43 to disperse the load. By this structure, the stress concentration on the resin plate 23 may be relieved, so that relatively high load may be withstood.

Further, after the seatback 2 is folded toward the seat cushion 1 as illustrated in FIG. 2, when baggage is put on the resin plate 23, unpleasant noise may be prevented from being produced by movement of the plurality of bosses in slight contact with the metallic seatback frame.

In the above example, the resin plate 23 and the plurality of protrusions (bosses) 24 are integrally formed. However, they may be formed separately rather than integrally, and a plurality of protrusions (bosses) 24 formed separately may be connected (bonded) to the resin plate 23.

In the description of the above example, for example, a difference in height between the protrusions (bosses) 241, 242 and the protrusions (bosses) 2401, 2402 is made, so that only the protrusions (bosses) 241, 242 are in contact with the metallic seatback frame 22 under no load on the resin plate 23. However, instead of making the difference in height between the protrusions (bosses) 241, 242 and the protrusions (bosses) 2401, 2402, all the protrusions (bosses) may be formed with the same height, and pits may be formed in portions of the seatback frame 22 corresponding to the protrusions (bosses) 2401, 2402 such that a gap of a distance d is created between the protrusions (bosses) 2401, 2402 and the seatback frame 22 under no load on the resin plate 23.

The invention carried out by the inventors has been detailed based on example embodiments, but it will be apparent that the present invention is not limited to the above examples and various modifications and variations can be made without departing from the scope and spirit of the invention. For example, the above examples have been described in detail for the purpose of explaining the present invention clearly, and the present invention is not necessarily limited to including all the components and configurations described above. Further, another well-known configuration can be substituted for/added to part of the configuration of each example.

REFERENCE SIGNS LIST

1 . . . seat cushion
2 . . . seatback
3 . . . headrest
22 . . . seatback frame
23 . . . resin plate
24, 241, 242, 243, 245, 246, 247, 2401, 2402, 2403, 2404, 2406, 2407, 2408 . . . protrusion (boss)
41, 42 . . . auxiliary frame
43 . . . transverse frame 51 . . . coupling bar
100 . . . vehicle seat

What is claimed is:

1. A vehicle seat, comprising:
a seat cushion;
a seatback; and
a headrest,
wherein the seatback has a seatback pad, a seatback frame and a resin plate,
the resin plate has a plurality of bosses formed thereon in positions facing the seatback frame, and
under no load on the resin plate, some of the plurality of bosses are in contact with the seatback frame and, under no load on the resin plate, the seatback frame and the remaining ones of the plurality of bosses are arranged with respect to one another with a gap between the seatback frame and the remaining ones of the plurality of bosses such that the remaining ones of the plurality of bosses are out of contact with the seatback frame.

2. The vehicle seat according to claim 1, wherein while the resin frame is deformed by application of load in a direction of the seatback frame to the resin frame, the some bosses and the remaining bosses are in contact with the seatback frame to bear the load.

3. The vehicle seat according to claim 1, wherein the seatback further includes an auxiliary frame connected to the seatback frame and a coupling frame connected to the auxiliary frame, and the bosses are formed including a position of the resin plate facing the auxiliary frame and in a position of the resin plate facing the coupling frame.

4. The vehicle seat according to claim 1, wherein of the plurality of bosses, the some bosses in contact with the seatback frame under no load on the resin plate are formed with a height from the resin plate higher than that of the remaining bosses out of contact with the seatback frame.

5. The vehicle seat according to claim 4, wherein a plurality of the some bosses formed with a height from the resin plate higher than that of the remaining bosses are arranged along the seatback frame, and the remaining bosses are formed in positions between the plurality of the some bosses.

6. The vehicle seat according to claim 1, wherein the plurality of bosses are formed integrally with the resin plate.

7. A vehicle seat, comprising:
a seat cushion;
a seatback; and
a headrest,
wherein the seatback has a seatback pad, a seatback frame and a resin plate,
the resin plate has a plurality of bosses of a higher height and a plurality of bosses of a lower height formed integrally therewith in positions facing the seatback frame, and
under no load on the resin plate, the seatback frame and the resin plate are arranged with respect to one another such that the plurality of bosses higher in height are in contact with the seatback frame and the plurality of bosses of the lower in height are out of contact with the seatback frame.

8. The vehicle seat according to claim 7, wherein while the resin frame is deformed by application of load in a direction of the seatback frame to the resin frame, the plurality of bosses higher in height and the plurality of bosses lower in height are in contact with the seatback frame.

9. The vehicle seat according to claim 7, wherein the seatback further includes an auxiliary frame connected to the seatback frame and a coupling frame connected to the auxiliary frame, and the plurality of bosses lower in height are formed including a position of the resin plate facing the auxiliary frame and in a position of the resin plate facing the coupling frame.

10. The vehicle seat according to claim 1, wherein pits are formed in portions of the seatback frame facing the remaining ones of the plurality of bosses.

11. The vehicle seat according to claim 10, wherein all of the plurality of bosses have the same height.

* * * * *